United States Patent [19]
Thompson et al.

[11] Patent Number: 5,333,011
[45] Date of Patent: Jul. 26, 1994

[54] ELECTRONIC IRIS CONTROL FOR SURVEILLANCE CAMERAS

[75] Inventors: Edwin Thompson, Loxahatchee; Philip A. Robertson, Boca Raton, both of Fla.

[73] Assignee: Sensormatic Electronics Corporation, Deerfield Beach, Fla.

[21] Appl. No.: 88,100

[22] Filed: Jul. 6, 1993

Related U.S. Application Data

[63] Continuation of Ser. No. 803,095, Dec. 5, 1991, abandoned.

[51] Int. Cl.⁵ .............................................. H04N 5/238
[52] U.S. Cl. .................................................. 348/363
[58] Field of Search ............... 358/227, 228, 229, 108, 358/194.1, 210, 209; 348/345, 221, 373, 374, 216, 207, 362, 211, 363; H04N 5/238, 5/30

[56] References Cited

U.S. PATENT DOCUMENTS

| | | | |
|---|---|---|---|
| 4,928,179 | 5/1990 | Takahashi et al. | 358/210 |
| 5,036,400 | 7/1991 | Haruki | 358/228 |
| 5,053,877 | 10/1991 | Kondo et al. | 358/228 |
| 5,057,927 | 10/1991 | Hieda | 358/228 |
| 5,068,735 | 11/1991 | Tuchiya | 358/209 |
| 5,161,026 | 11/1992 | Mabuchi et al. | 358/225 |

Primary Examiner—Joseph Mancuso
Assistant Examiner—Tuan V. Ho
Attorney, Agent, or Firm—Robin, Blecker, Daley & Driscoll

[57] ABSTRACT

An auto-iris control device for automatically controlling an adjustable iris of a surveillance camera. The auto-iris control device has an adjustably settable reference level which can be adjusted by an operator at a remote location. A comparator compares the reference level against the average video level of the video signal output from the surveillance camera. Based upon the result of the comparison, iris control signals are generated for controlling the adjustable iris.

14 Claims, 3 Drawing Sheets

ELECTRONIC IRIS CONTROL FOR SURVEILLANCE CAMERAS

This is a continuation application under 37 CFR 1.62 of prior application Ser. No. 803,095, filed Dec. 5, 1991, now abandoned.

FIELD OF THE INVENTION

This invention relates to an auto-iris control device which controls an adjustable iris of a camera system via an auto-iris control signal, and in particular, to an auto-iris control device which utilizes a reference level to develop its auto-iris control signal.

BACKGROUND OF THE INVENTION

In a typical surveillance camera system having an auto-iris capability, the brightness of the video picture is a function of the average video level of the video signal output from the camera. To automatically control the brightness of the video picture, an auto-iris control circuit develops an auto-iris control signal which controls an adjustable iris of the camera. The auto-iris control circuit develops the control signal based upon a comparison of the average video level of the video signal output from the camera and a factory preset reference level.

When the average video level is determined to be higher than the factory preset reference level, the control signal causes the adjustable iris to decrease the amount of light reaching the camera, thereby decreasing the average video level of the video signal output from the camera. Conversely, when the average video level is determined to be lower than the factory preset reference level, the control signal causes the adjustable iris to increase the amount of light reaching the camera, thereby increasing the average video level of the video signal output from the camera. In this way, the average video level of the video signal output is maintained nearly equal to the factory preset reference level.

The auto-iris control circuit described above provides acceptable results over a wide range of illumination levels, provided the entire picture is evenly illuminated. However, whet the subject of the picture is much darker than the background of the picture, the subject may appear as a silhouette or may not be visible at all. For example, when the surveillance camera is aimed at the front license plate of a vehicle having its headlights on, due to the bright headlights, the average video level of the output of the camera exceeds the factory preset reference level. Accordingly, the control signal of the auto-iris circuit controls the adjustable iris to reduce the average video level to a level equal to the factory preset reference level. However, at such a level, an insufficient amount of light is received from the license plate to render the license plate number visible.

The opposite problem occurs when the subject of the picture is much brighter than the background of the picture. For example, when a surveillance camera in a dimly lit warehouse is viewing a brightly lighted subject located at a loading door, to average video level output from the camera is less than the factory preset reference level. As a result, the control signal of the auto-iris circuit controls the adjustable iris so as to increase the average video level of the camera's output to a level equal to the factory preset reference level. However, at such a level, the adjustable iris permits too much light to be received from the subject, and therefore, the subject appears over-illuminated.

In order to accommodate the above uneven lighting conditions in a surveillance camera with auto-iris control, the camera is usually provided with a manual override mode. When in the manual override mode, the auto-iris feature is disabled and the adjustable iris can be manually controlled from a remote control panel. While the manual override mode allows the user to set the adjustable iris as desired to overcome uneven lighting conditions, it also requires that the user manually readjust the iris each time the lighting conditions change. As a result, if the camera is inadvertently left in the manual override mode, the iris will no longer automatically react to the changing lighting conditions and therefore, subsequent surveillance operations may be made with an undesirable iris setting.

While surveillance type cameras have used the above manual mode technique to compensate for uneven lighting conditions, video cameras used in the consumer field, i.e., so-called "camcorders", have attempted to treat at least the silhouette problem in a different way. In such camcorders, a fixed level "backlighting compensation" switch is provided, which when set, causes the setting of the aperture of the iris to be increased a fixed amount over the aperture setting which is automatically set by the auto-iris control signal based on a comparison of the average video level and a factory preset reference level. However, such camcorders only provide a single compensation setting, which may or may not be appropriate for the given lighting condition. Further, the camcorder does not provide compensation for an over-illuminated condition.

The typical surveillance camera with auto-iris control as described above has a further disadvantage in that the auto-iris control circuit does not know when the adjustable iris is at its maximum setting or minimum setting position. Therefore, under certain conditions, the auto-iris control circuit attempts to drive the adjustable iris beyond its maximum and minimum operable positions. Accordingly, to prevent damage to the adjustable iris or drive motor due to this excessive driving by the auto-iris control circuit, the adjustable iris is required to contain a complicated slip clutch mechanism or limit switches.

It is, therefore, a primary object of the present invention to provide an improved auto-iris control for a surveillance camera.

It is a further object of the present invention to provide an auto-iris control for a surveillance camera which permits manual adjustment of the average video level of the video signal output from the camera while maintaining the auto-iris control.

It is a still further object of the present invention to provide an auto-iris control circuit which prevents the adjustable iris from being driven beyond its maximum and minimum operable positions.

SUMMARY OF THE INVENTION

In accordance with the principles of the present invention, the above and other objectives are realized in an auto-iris control device for controlling an adjustable iris of a camera in which the control device has an adjustably settable reference level which is used to develop an auto-iris control signal for controlling the average video signal output from the camera. The automatic iris control device has means for receiving reference level adjustment signals in the form of iris commands and means for adjusting the setting of the reference level responsive to the received commands.

Comparing means are further provided for comparing the set reference level against the average video signal. Based upon the result of the comparison, the auto-iris control signal is generated for controlling the adjustable iris.

In the disclosed embodiment, an integration means integrates the video signal output from the camera system and forms a signal indicative of the average video level. The comparison means has an analog-to-digital converter which converts the signal indicative of the average video level into a digital representation of the average video level. The digital repesentation is then compared by the comparison means against a digital representation of the set reference level, and based upon the results of the comparison, an iris control signal is generated.

As can be appreciated, with the auto-iris control device of the invention, an operator at a remote control panel can transmit appropriate iris commands to selectively adjust the setting of the reference level of the control device. This, in turn, results in setting of the average video level of the video signal output from the camera system. Further, during and after setting of the reference level, the auto-iris control device continues to generate its control signal so as to provide auto-iris control.

In a further aspect of the invention, the auto-iris control device is adapted to detect and store signals which are indicative of the maximum aperture setting and the minimum aperture setting of the adjustable iris. The iris control device then uses these signals and a signal indicative of the current aperture setting so as to generate its iris control signal in a way to maintain the iris aperture between the maximum and minimum aperture settings. As a result, mechanical devices for preventing damage to the iris when driven beyond its operable limits are no longer needed.

In yet a further aspect of the invention, the iris control device is further adapted so that it does not respond to iris commands for adjusting the setting of its reference level when the adjustable iris is at its maximum aperture setting and the commands would change the reference level to a level requiring an aperture setting above the maximum or when the iris is at its minimum aperture setting and the commands would change the reference level to a level requiring an aperture setting below the minimum.

BRIEF DESCRIPTION OF THE DRAWINGS

The above and other features and aspects of the present invention will become more apparent upon reading the following detailed description in conjunction with the accompanying drawings, in which.

DETAILED DESCRIPTION

Figure 1:
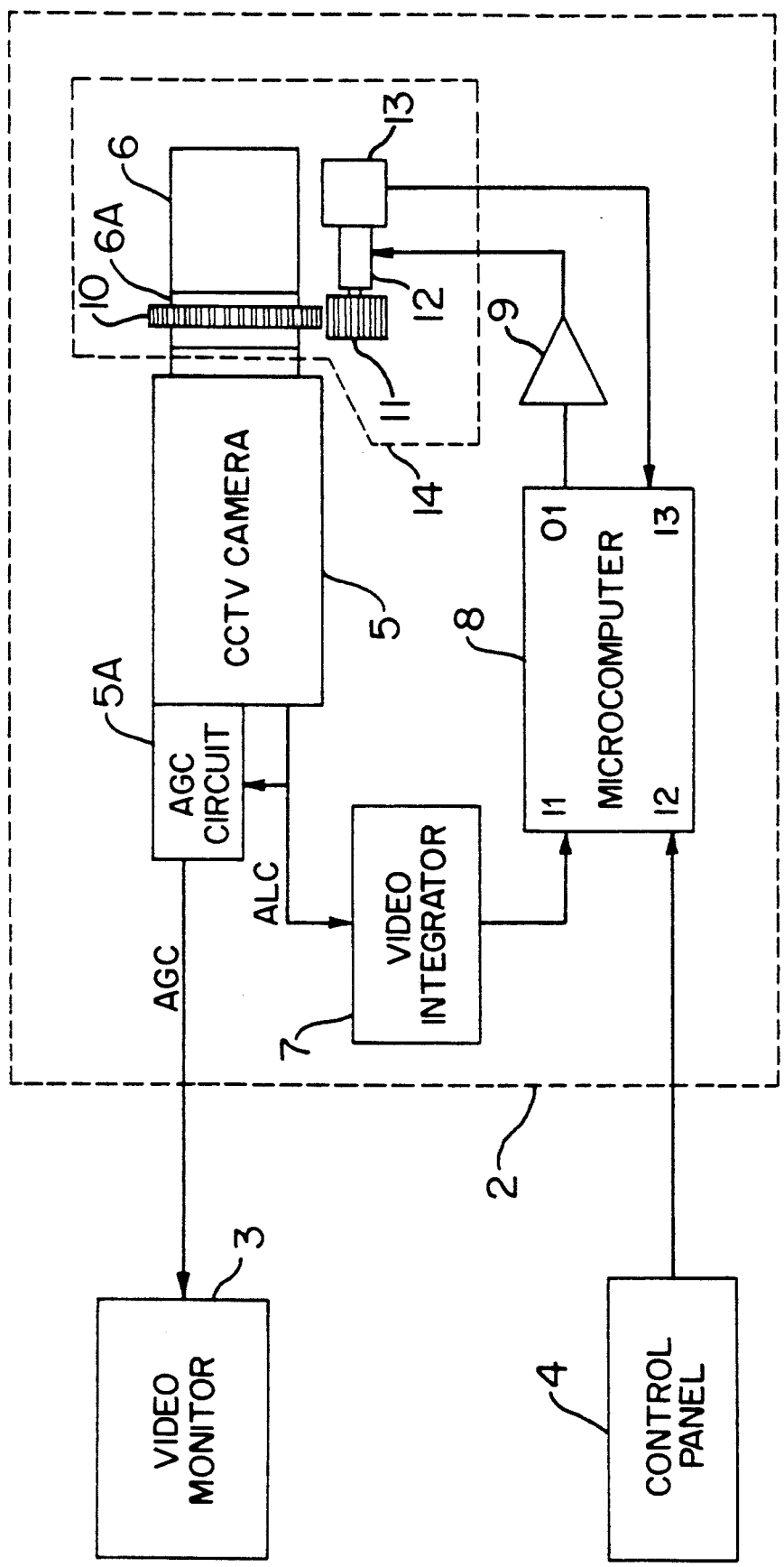
FIG. 1 shows a block diagram of a surveillance system using a camera having an auto-iris control in accordance with the principles of the present invention.

FIG. 1 shows a surveillance system 1 employing an auto-iris camera 2 having auto-iris control in accordance with the principles of the present invention. A video monitor 3 receives an automatic gain controlled (AGC) video signal from the auto-iris camera 2 and displays a picture image corresponding to the received video signal. A control panel or station 4 remote from the camera 2 accepts various commands entered by an operator at an input device, such as a keypad (not shown), and transmits the entered commands to the auto-iris camera 2.

The auto-iris camera 2 comprises a CCTV camera 5 which receives, through an adjustable lens 14, the light reflected by the scene under surveillance. The CCTV camera 5 converts the received light into an ALC video signal (a video signal proportional to the received light) a portion of which is fed to a video integrator 7. As part of the CCTV camera 5, an automatic gain control (AGC) circuit 5A amplifies a further portion of the ALC video signal to a predetermined level and outputs the resulting AGC video signal to the video monitor 3.

The video integrator 7 rectifies and integrates the received portion of the ALC video signal and generates a DC voltage output which is directly proportional to the average video level of the ALC signal. The output of the video integrator 7 is applied to an input I1 of a microcomputer 8.

The microcomputer 8 comprises an analog-to-digital converter (not shown) which converts the DC voltage (which is representative of the average video level of the ALC video signal) received at the input I1 to a digital value. The microcomputer 8 also includes a serial input I2 for receiving iris commands from the control panel 4 and an output O1 and an input I3 for communicating with the adjustable lens 14.

The adjustable lens 14 includes an adjustable iris section 6A whose aperture (not shown) can be adjusted by rotation of the section. For rotating the iris section 6A, the adjustable lens 14 comprises a first gear 10 mounted to the iris section 6A and a second gear mounted to the shaft of a motor 12. Rotation of the motor 12 causes the gear 11 and, hence, the gear 10 to rotate. The latter rotation, in turn, rotates the adjustable iris section 6A, whereby its aperture setting is changed.

An encoder 13 detects the rotational position of the shaft of the motor 12. As can be appreciated, since the rotational position of the motor 12 determines the rotational position of the adjustable iris section 6A, the output of the encoder 13 is indicative of the aperture setting of the iris. This output (encoded iris signal) is fed to the input I3 of the microcomputer 8 so as to provide the microcomputer with an accurate indication of the aperture setting.

The motor 12 is driven by a pulse width modulated (PWM) control signal originating at output O1 of the microcomputer 8 and amplified by a buffer 9. The PWM control signal accurately controls the speed of the motor 12. A direction signal (not shown) is also provided from the microcomputer 8 through the buffer 9 to the motor 12 for controlling the direction of motor rotation. Accordingly, the microcomputer 8 can accurately drive the iris to different aperture settings.

In accordance with the principles of the present invention and as will be discussed in greater detail below, the microcomputer 8 stores a reference level which is adjustably settable via iris commands transmitted to the microcomputer input port I2 from the remote control panel 4. Using this reference level, the microcomputer then develops the PWM control signal for the adjustable iris section 6A based upon a comparison of the reference level with a digital representation of the DC level at the microcomputer input I1, i.e., the average video level of the ALC video signal.

Figure 2:
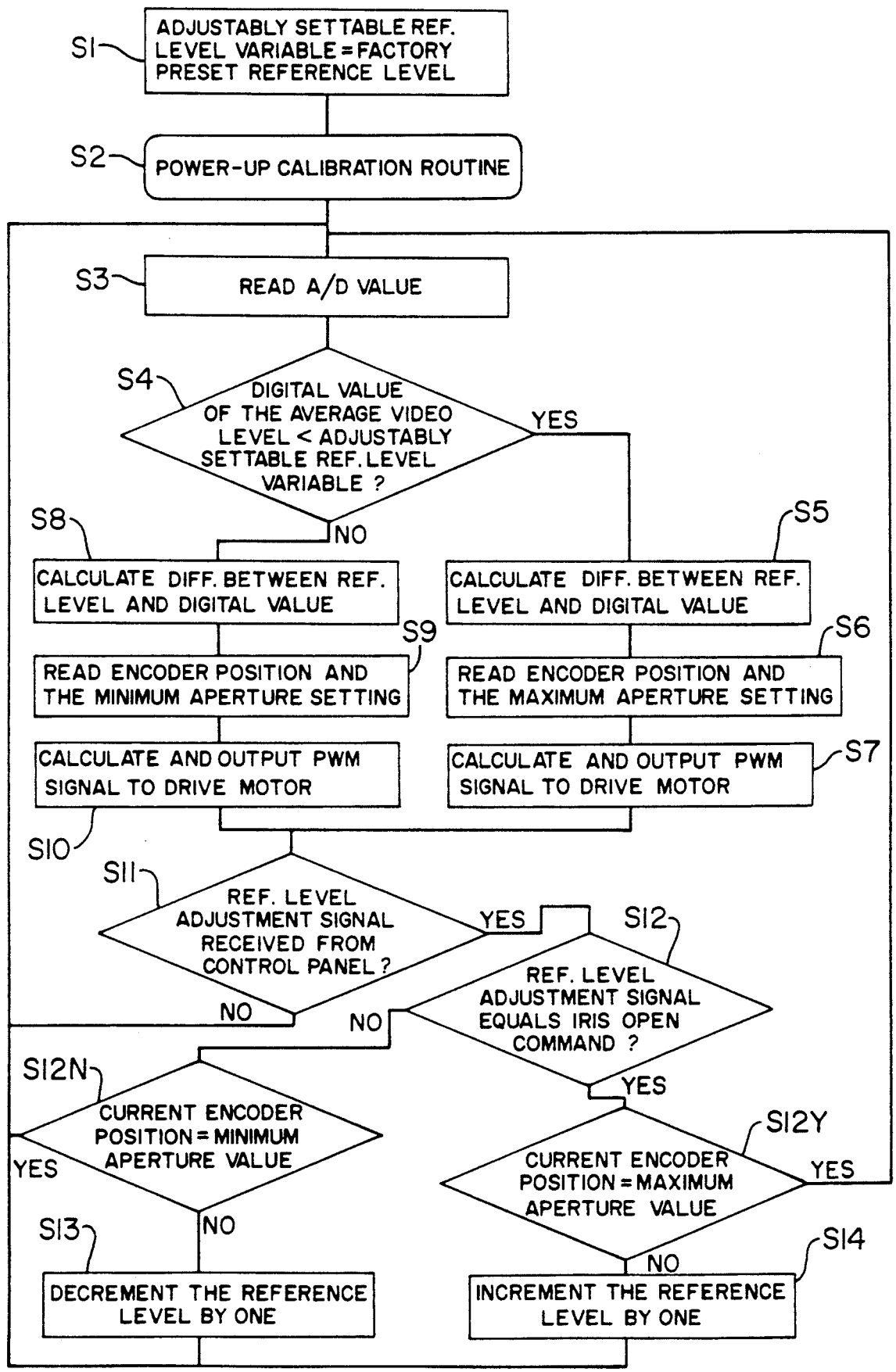
FIG. 2 is a flowchart illustrating the operation of the microcomputer 8 of the iris control device of FIG. 1.

FIG. 2 is a flow chart illustrating the operating cycle of the microcomputer 8. When the microcomputer 8 is initialized, a program cycle starts at STEP S1.

At STEP S1: (ADJUSTABLY SETTABLE REF. LEVEL VARIABLE=FACTORY PRESET REFERENCE LEVEL), an internal memory register (not shown) of the microcomputer 8 contains a reference level variable. The reference level variable is set to equal a factory preset reference level. The factory preset reference level can be a fixed variable stored in the operating program of the microcomputer 8, or can be a value preset by the manufacturer in nonvolatile memory, such as an EEPROM or a DIP switch, which is read by the microcomputer 8 upon initialization.

At STEP S2: (POWER-UP CALIBRATION ROUTINE), a calibration subroutine is called which stores digital values (minimum aperture value and maximum aperture value) in internal memory registers of the microcomputer (not shown) corresponding to the minimum aperture setting of the iris and the maximum aperture setting of the iris respectively. The calibration routine will be described in more detail with reference to the flowchart of FIG. 3.

At STEP S3: (READ A/D VALUE), the microcomputer's internal analog-to-digital converter (not shown) converts the DC voltage received at input I1 into a corresponding digital value. As above-indicated, the DC voltage received at input I1 is the output of the video integrator 7 and represents the average video level of the ALC video signal from the CCTV camera Accordingly, the corresponding digital value is representative of the average video signal of the ALC video signal.

At STEP S4: (DIGITAL VALUE OF THE AVERAGE VIDEO LEVEL<ADJUSTABLY SETTABLE REF. LEVEL VARIABLE?), the reference level variable is compared with the digital value obtained in STEP S3. If the digital value obtained in STEP S3 is less than the reference level variable, the average video level (brightness) of the ALC video signal is too low, and the aperture of the adjustable iris must be set to permit more light to reach the CCTV camera 5 (STEPS S5-S7). However, if the digital value is greater than the reference level variable, the average video level (brightness) of the ALC video signal is too high, and the adjustable iris must be set so as to restrict the light reaching the CCTV camera 5 (STEPS S8-S10).

At STEP S5: (CALCULATE THE DIFF. BETWEEN REFERENCE LEVEL AND DIGITAL VALUE), the difference between the reference level variable and the digital value obtained in STEP S3 is calculated.

At STEP S6: (READ ENCODER POSITION AND THE MAXIMUM APERTURE SETTING), the output from the encoder 13 is received at the microcomputer input I3. Based upon the information previously received from encoder 13, the difference calculated in STEP S5 and the maximum aperture setting, the microcomputer 8 determines a duty cycle for the PWM signal to be supplied at its output O1. This determined duty cycle is such as to change the aperture setting to increase the average video level of the ALC video toward the reference level. The microcomputer will not attempt to move the aperture beyond its maximum aperture setting.

At STEP S7: (OUTPUT PWM SIGNAL TO DRIVE MOTOR), the microcomputer 8 then outputs a PWM signal from its output O1 having the duty cycle determined in step 55. The duty cycle of the PWM signal determines the speed at which the motor 12 is driven. A directional bit (not shown) output from the micrcomputer 8 determines the direction of the drive. The program then proceeds to STEP S11.

At STEP S8: (CALCULATE THE DIFF. BETWEEN REFERENCE LEVEL AND DIGITAL VALUE), the difference between the reference level variable and the digital value obtained in STEP S3 is calculated.

At STEP S9: (READ ENCODER POSITION AND THE MINIMUM APERTURE SETTING), the output from the encoder 13 is received at the microcomputer input I3. Based upon the the information previously received from the encoder 13, the difference calculated in STEP S8 and the minimum aperture setting, the microcomputer 8 determines a duty cycle for the PWM signal to be supplied at its output O1. This determined duty cycle is such as to change the aperture setting to decrease the average video level of the ALC video toward the reference level. The microcomputer will not attempt to move the aperture beyond its minimum aperture setting.

At STEP S10: (OUTPUT PWM SIGNAL TO DRIVE MOTOR), the microcomputer 8 then outputs a PWM signal from output O1 having the duty cycle determined in STEP S9. The duty cycle of the PWM signal determines the speed of driving the motor 12. A directional bit (not shown) output from the microcomputer 8 determines the direction of driving the motor 12.

At STEP S11: (REFERENCE LEVEL ADJUSTMENT SIGNAL RECEIVED FROM CONTROL PANEL?), a check is made to determine whether input I2 of the microcomputer 8 has received any adjustment signals for resetting the reference level. These signals in the present illustrative system are transmitted via the control panel 4 using the same iris open and iris closed commands previously used for manual adjustment of the aperture settings of a manual iris. If a command has not been received, the program jumps to STEP S3.

At STEP S12: (REFERENCE LEVEL ADJUSTMENT SIGNAL=IRIS OPEN COMMAND?) If the command received from the control panel is an iris open command, progress is made to STEP S12Y, otherwise progress is made to STEP S12N.

At STEP S12Y: (CURRENT ENCODER POSITION=MAXIMUM APERTURE VALUE) the encoder position supplied to input port I3 of the microcomputer is compared against the maximum aperture setting value obtained in STEP S2. If the encoder position is not equal to the maximum aperture value, the microcomputer increases the reference level variable by one at STEP S14. If the values are equal, the value of the reference level variable is not changed and progress is made to STEP S3.

By skipping STEP S14 when the aperture setting is at the maximum aperture setting, the reference level is prevented from being erroneously increased. Had the reference level variable been allowed to increase while at a maximum aperture setting, the aperture setting would not have increased. However, at a later time when the light level increased, the picture brightness would have been too bright and the reference level variable would require readjustment.

At STEP S12N: (CURRENT ENCODER POSITION=MINIMUM APERTURE VALUE) the encoder position supplied to input port I3 of the microcomputer is compared against the maximum aperture value obtained in STEP S2. If the encoder position is not equal to the minimum aperture value, the microcomputer decreases the reference level variable by one at STEP S13. If the values are equal, the value of the reference level variable is not changed and progress is made to STEP S3.

By skipping STEP S13 when the aperture setting is at the minimum aperture setting, the reference level is prevented from being erroneously decreased. Had the reference level variable been allowed to decrease while at a minimum aperture setting, the aperture setting would not have decreased. However, at a later time when the light level decreased, the picture brightness would have been too dark and the reference level variable would require readjustment.

As can be appreciated, each time the above program cycle repeats, the adjustable iris is controlled to make the average video level (brightness) of the ALC video signal output from the CCTV camera 5 track the adjustably settable reference level set in the microcomputer 8. Furthermore, to compensate for varied lighting conditions, an operator of the system can manually set the adjustably settable reference level to a setting which effects the desired change in the average video level (brightness) of the video signal.

This is accomplished by the operator issuing iris open or iris close commands from the control panel, as above-described. Such commands result in the reference level being incremented or decremented, provided the iris aperture is not at its maximum or minimum setting, respectively. Thereafter, automatic iris control is continued with the average video level (brightness) of the video signal made to track the set reference level.

With the present system, automatic iris control continues during and after the manual adjustment of the reference level to achieve a desired change in average video level (brightness) of the video signal. Furthermore, the resolution of the manual adjustment is limited only by the resolution of the analog-to-digital converter of the microcomputer 8. Accordingly assuming that the analog-to-digital converter has an eight bit resolution, then 256 different reference levels and corresponding average video levels (brightnesses) can be manually selected.

Figure 3:
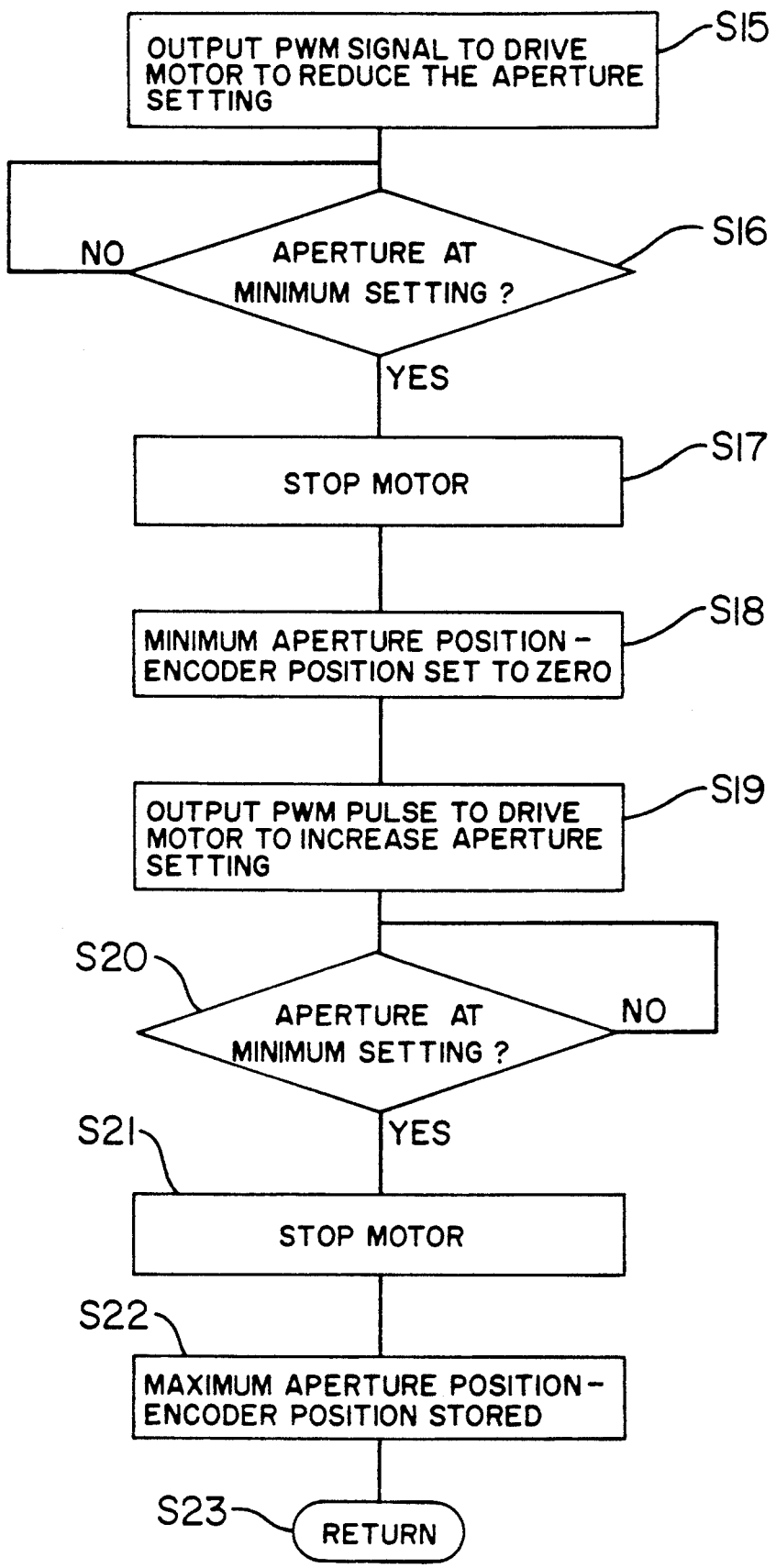
FIG. 3 is a flowchart illustrating in greater detail the STEP S2, POWER-UP CALIBRATION ROUTINE, of the flowchart of FIG. 2.

The above-mentioned power-up calibration routine (STEP S2) of FIG. 2 will now be described with reference to the flowchart of FIG. 3.

At STEP S15: (OUTPUT PWM SIGNAL TO DRIVE MOTOR TO REDUCE THE APERTURE SETTING), the microcomputer outputs a PWM signal to slowly drive the motor 12 in a direction which causes the rotating iris section 6A to turn and reduce the aperture setting.

At STEP S16: (APERTURE AT MINIMUM SETTING?), the encoder output pulses are monitored. The program remains at STEP S16 until the encoder stops outputting pulses which indicates that the aperture has reached the mechanical stop in the lens which corresponds to the minimum setting or position of the aperture.

At STEP S17: (STOP MOTOR), the microcomputer 8 stops outputting the PWM signal, thereby deenergizing the motor 12.

At STEP S18: (MINIMUM APERTURE POSITION=ENCODER POSITION SET TO ZERO), an encoder position register (not shown) internal to the micrcomputer 8 is set to zero value at the minimum aperture postion. The value of this register is checked to see if it is at zero during subsequent program steps to prevent the microcomputer 8 from attempting to drive the aperture beyond the minimum aperture setting. This protects the drive motor from being damaged.

At STEP S19: (OUTPUT PWM PULSE TO DRIVE THE MOTOR TO INCREASE THE APERTURE SETTING), the microcomputer outputs a PWM signal to slowly drive the motor 12 in the direction which causes the aperture setting to increase.

At STEP S20: (APERTURE AT MAXIMUM SETTING?), the encoder output pulses are monitored. The program remains at STEP S20 until the encoder pulses indicate that the aperture has reached the mechanical stop in the lens which corresponds to the maximum setting or position of the aperture.

At STEP S21: (STOP MOTOR), the microcomputer 8 stops outputting the PWM signal, thereby deenergizing the motor At STEP S22: (MAXIMUM APERTURE POSITION/ENCODER POSITION STORED), the value of the encoder position register at the maximum aperture setting is stored. This stored value is checked during subsequent program steps to prevent the microcomputer 8 from attempting to drive the aperture beyond this setting. This also protects the drive motor from being damaged.

Accordingly, by using the above encoder position register values associated with the maximum and minimum aperture settings and performing subsequent checks to ensure that the motor does not attempt to drive the aperture past these limits, the complexity of the lens unit is reduced. For example, the lens unit does not require limit switches or a slip clutches previously used for this purpose.

In all cases it is understood that the above-described arrangements are merely illustrative of the many possible specific embodiments which represent applications of the present invention. Numerous and varied other arrangements can readily devised in accordance with the principles of the present invention without departing from the spirit and scope of the invention.

What is claimed is:

1. An automatic iris control device for automatically controlling an adjustable iris of a camera system, the camera system comprising a camera for providing a video signal output and means responsive to said video signal output for generating a further signal indicative of the average video level of the video signal output, the camera system being responsive to reference level adjustment signals transmitted to the camera system from a control station remote from the camera system, the setting of the adjustable iris affecting the average video level of the video signal output from the camera system, the automatic iris control device comprising:

a microcomputer for:

receiving said reference level adjustment signals;

adjusting an adjustably settable reference level in response to the reference level adjustment signals received;

receiving said further signal indicative of the average video level of the video signal output of the camera system;

comparing the average video level of the video signal output of the camera system indicated by said received further signal with said adjustably settable reference level and outputting a comparison result; and generating iris control signals for controlling the adjustable iris of the camera system based upon said comparison result.

2. An automatic iris control device as claimed in claim 1 further comprising:

integration means for integrating the video signal output from the camera system, the integration means outputting said further signal indicative of the average video level of the video signal output from the camera system.

3. An automatic iris control device as claimed in claim 2 wherein said microcomputer:

converts said received further signal indicative of the average video level output into a digital representation of said average video level.

4. An automatic iris control device as claimed in claim 3 wherein said microcomputer:

stores a digital representation of said adjustably settable reference level.

5. An automatic iris control device as claimed in claim 4 wherein said microcomputer:

compares the average video level with said adjustably settable reference level by comparing said digital representation of said average video level with said digital representation of said adjustably settable reference level.

6. An automatic iris control device as claimed in claim 1 wherein:

said reference level adjustment signals include at least on of an iris open command and an iris close command.

7. An automatic iris control device as claimed in claim 6 wherein said microcomputer:

increases said adjustably settable reference level responsive to receiving said iris open command.

8. An automatic iris control device as claimed in claim 7 wherein said microcomputer:

decreases said adjustably settable reference level responsive to said receiving means receiving said iris close command.

9. An automatic iris control device as claimed in claim 1 wherein said microcomputer:

generates a first iris control signal responsive to the comparison result indicating that the average video level is less than said adjustably settable reference level, said first iris control signal controlling an increase in an aperture setting of the adjustable iris; and generates a second iris control signal responsive to the comparison result indicating that the average video level is greater than said adjustably settable reference level, said second iris control signal controlling a decrease in an aperture setting of the adjustable iris.

10. An automatic iris control device as claimed in claim 1 wherein said microcomputer:

further receives an iris signal representative of an aperture setting of the adjustable iris;

stores a first aperture value corresponding to a first aperture setting of the adjustable iris; and stores a second aperture value corresponding to a second aperture setting of the adjustable iris.

11. An automatic iris control device as claimed in claim 10 wherein said microcomputer:

inhibits adjusting said adjustably settable reference level in response to a reference level adjustment signal; when said iris signal is indicative of said iris being at said first aperture setting and said reference level adjustment signal is such as to require the reference level to be adjusted such as to cause the aperture setting of said iris to be increased above said first aperture value; and when said iris signal is indicative of said iris being at said second aperture setting and said reference level adjustment signal is such as to require the reference level to be adjusted such as to cause the aperture setting of said iris to be decreased below said second aperture value.

12. An automatic iris control device as claimed in claim 10 wherein said microcomputer:

is further responsive to said iris signal and said first and second aperture values and uses said iris signal and said first and second aperture values, with said comparison result to generate said iris control signals.

13. An automatic iris control device as claimed in claim 12 wherein said microcomputer:

forms said iris control signals such as to maintain the aperture setting of the adjustable iris between said second aperture setting and said first aperture setting.

14. A system comprising:

a camera system including: a camera for providing a video signal output; means responsive to said video signal output for generating a further signal indicative of the average video level of the video signal output; an adjustable iris, the setting of said adjustable iris affecting the average video level of the video signal output from the camera system, the automatic iris control device comprising: a microcomputer for: receiving reference level adjustment signals; adjusting an adjustably settable reference level in response to the reference level adjustment signals received; receiving said further signal indicative of the average video level of the video signal output; comparing the average video level of the video signal output from said camera indicated by said received further signal with said adjustably settable reference level and outputting a comparison result; and generating iris control signals for controlling the adjustable iris based upon said comparison result;

and a control station remote from said camera system for transmitting said reference level adjustment signals to said camera system for receipt by said microcomputer of said automatic iris control device.

* * * * *

UNITED STATES PATENT AND TRADEMARK OFFICE
CERTIFICATE OF CORRECTION

PATENT NO. : 5,333,011
DATED : July 26, 1994
INVENTOR(S) : Thompson et al.

It is certified that error appears in the above-indentified patent and that said Letters Patent is hereby corrected as shown below:

Col. 1, line 62, change "to" to --the--

Col. 7, line 45, after "accordingly" insert --,--

Col. 8, line 13, after "motion" insert --12.--

Col. 8, line 39, delete "a"

Col. 10, line 43, change "the camera system," to --said camera;-- and change "the" to --and an--

Signed and Sealed this

Twenty-fifth Day of October, 1994

Attest:

BRUCE LEHMAN

Attesting Officer

Commissioner of Patents and Trademarks